J. W. CARTER.
LAMP.
No. 170,523.  Patented Nov. 30, 1875.
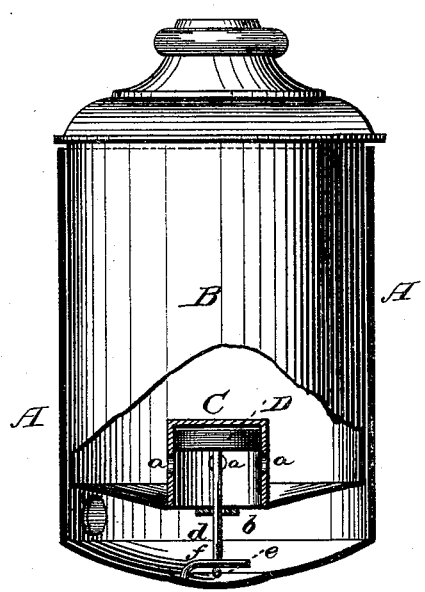
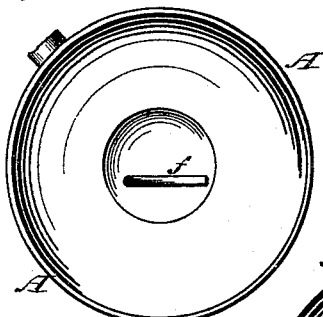
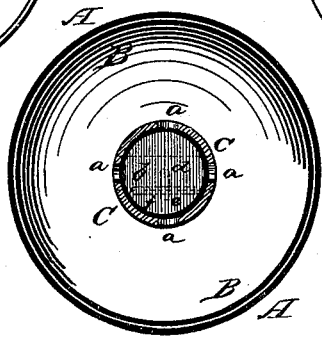
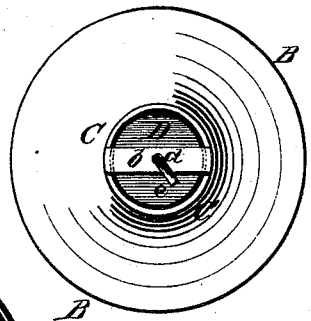
Witnesses:
Inventor:
John W. Carter
Per:— C. H. Watson & Co. Attorneys.

UNITED STATES PATENT OFFICE.

JOHN W. CARTER, OF BROOKLYN, NEW YORK, ASSIGNOR TO BENNETT B. SCHNEIDER, OF NEW YORK CITY.

IMPROVEMENT IN LAMPS.

Specification forming part of Letters Patent No. 170,523, dated November 30, 1875; application filed November 19, 1875.

CASE B.

*To all whom it may concern:*

Be it known that I, JOHN W. CARTER, of Brooklyn, in the county of Kings and State of New York, have invented certain new and useful Improvements in Lamps; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to that class of lamps in which the burner is situated away from the oil-reservoir, and connected thereto by a pipe; and it consists in providing the bottom of the reservoir with an inverted cup having apertures in its sides, and an interior sliding valve for opening and closing the same by the upward and downward movement of the reservoir, as will be hereinafter more fully set forth.

In the annexed drawing, Figure 1 is a side elevation, partly in section, of my invention. Fig. 2 is a horizontal section of the same. Fig. 3 is a plan view of the exterior cup. Fig. 4 is a bottom view of the reservoir.

A represents the cup in which the reservoir B is inserted, said cup being connected with the burner in the usual manner. In the bottom of the reservoir B is an inverted cup, C, having apertures $a$ in its sides and a plate or bar, $b$, across the center of its lower end. Within the cup C is placed a piston or plunger, D, having a piston-rod, $d$, passing downward through a hole in the center of the plate or bar $b$, and the lower end of this rod is bent to form a hook, $e$, as shown. In the bottom of the cup A is fastened a hook, $f$, under which the hook $e$ may be brought by turning the reservoir B.

When the hooks are thus interlocked the reservoir may be drawn upward for a short distance, causing the piston-cork D to close the apertures $a$, preventing the oil from escaping from the reservoir.

When the reservoir is pushed into the cup the piston or cork is forced upward, opening the said apertures, and allowing the oil to flow.

Having thus fully described my invention, what I claim as new, and desire to secure by Letters Patent, is—

The combination of the oil-reservoir B with inverted cup C, having apertures $a$, the piston D, and rod $d$ with hook $e$, with the hook $f$ in the bottom of the cup A, substantially as and for the purposes herein set forth.

In testimony that I claim the foregoing as my own I affix my signature in presence of two witnesses.

JOHN W. CARTER.

Witnesses:
J. C. SHEFFIELD,
W. H. TRIPP.